United States Patent [19]

Anthouard et al.

[11] Patent Number: 4,908,625

[45] Date of Patent: Mar. 13, 1990

[54] DEVICE FOR PROCESSING SIGNALS FROM A SIDE-LOOKING RADAR

[75] Inventors: Pierre Anthouard; Roland Carre, both of Paris, France

[73] Assignee: Thomson-CSF, Paris, France

[21] Appl. No.: 769,891

[22] Filed: Feb. 15, 1977

[30] Foreign Application Priority Data

Apr. 2, 1976 [FR] France .................................. 7609708

[51] Int. Cl.$^4$ .......................... G01S 13/90; G01S 7/44
[52] U.S. Cl. ...................................... 342/25; 342/194
[58] Field of Search .............. 343/5 CM; 342/25, 181, 342/194, 195, 197

[56] References Cited

U.S. PATENT DOCUMENTS 3,603,992  9/1971  Goggins, Jr. et al. ................. 342/25
3,680,103  7/1972  Houser et al. ......................... 342/25
3,927,405  12/1975  Poinserd .............................. 342/194
4,110,753  8/1978  Sirven ............................. 342/194 X Primary Examiner—Stephen C. Buczinski
Assistant Examiner—Gilberto Barrón, Jr.
Attorney, Agent, or Firm—Herbert Dubno

[57] ABSTRACT

Video signals delivered by a side-looking radar system during M successive recurrences in each section of a sweep range are sampled, coded and registered in the form of a series of samples of modulus $\rho_i$ and a series of samples of phase $\phi_i$. The device performs the correlation with a series of samples $\theta_i$ of a synthesized replica by computing, for each recurrence, the modulus of a vector whose components are:

$$X' = \sum_{i=1}^{M} \rho_i \cos(\phi - \theta) \text{ and } Y' = \sum_{i=1}^{M} \rho_i \sin(\phi_i - \theta_i).$$

11 Claims, 5 Drawing Sheets

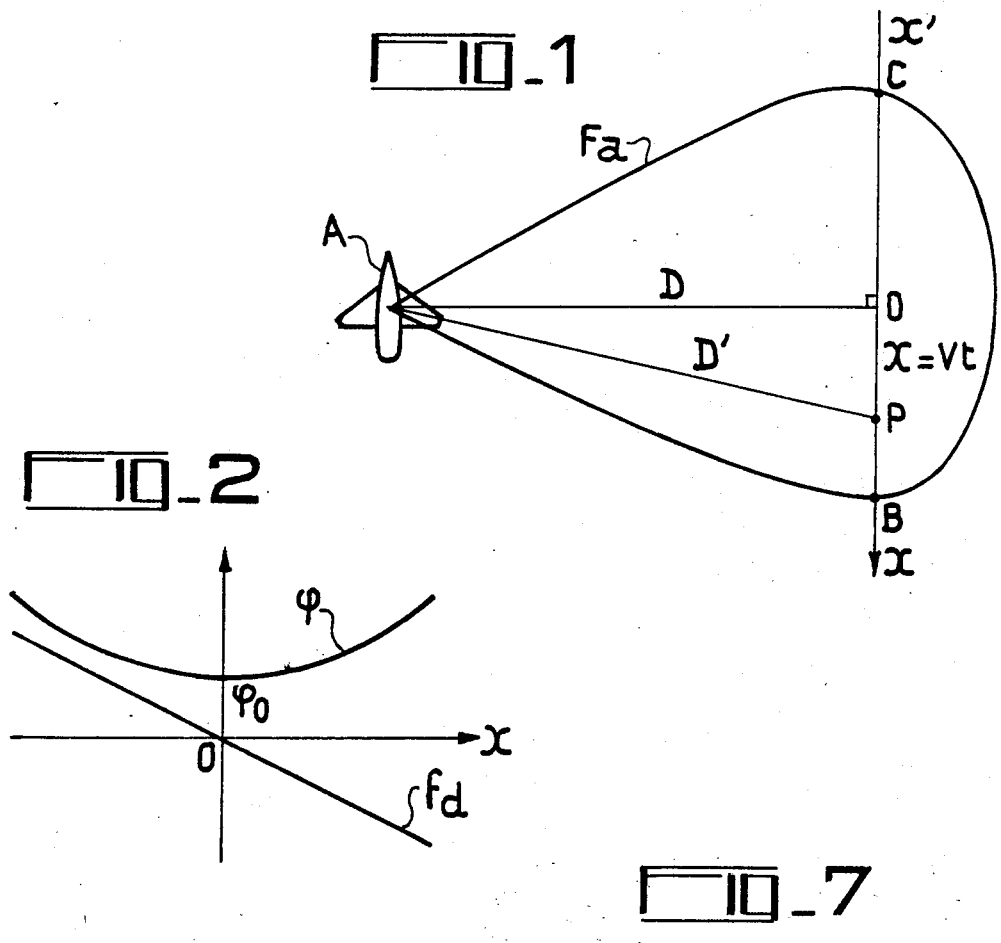

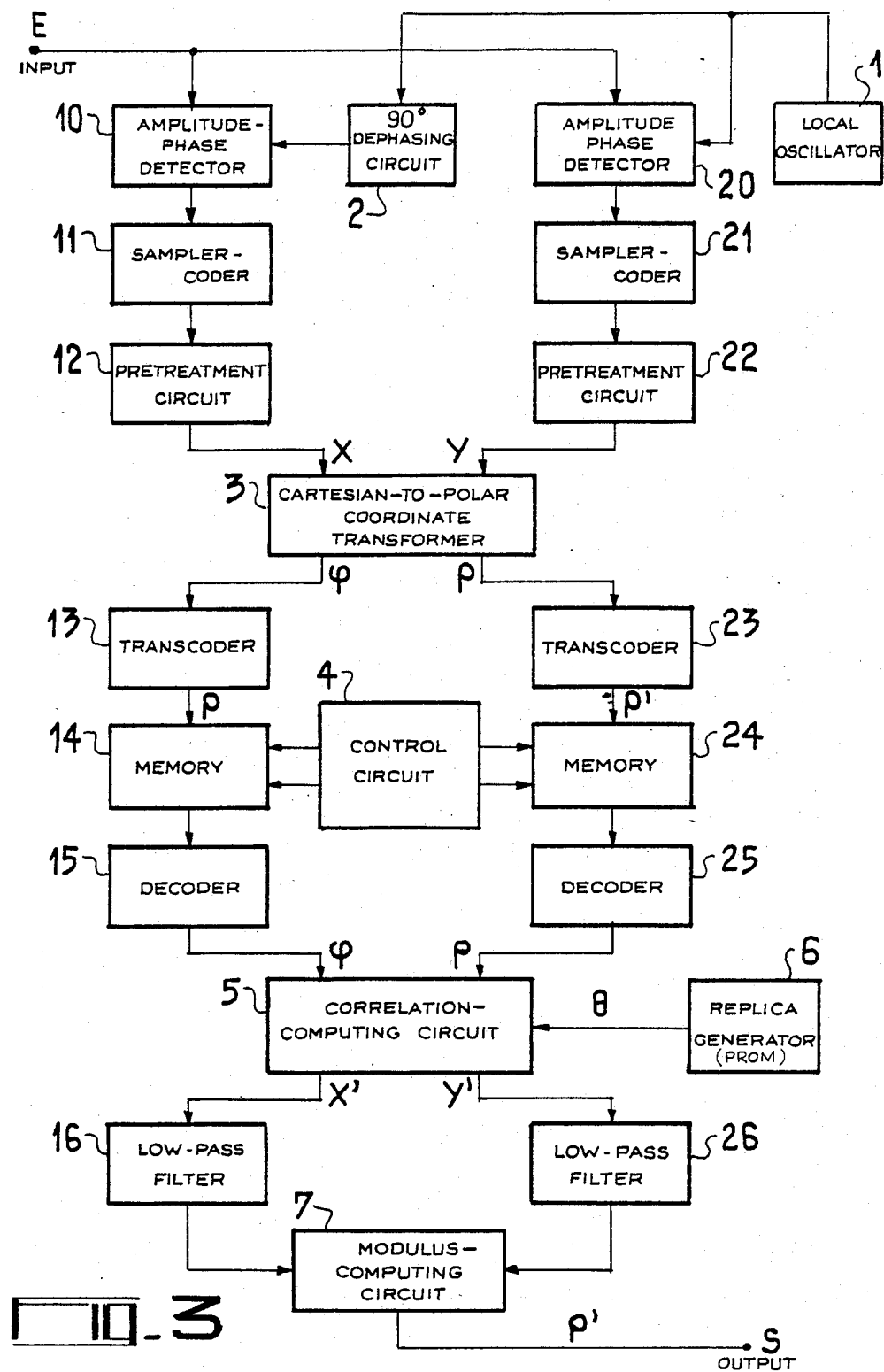
FIG_3

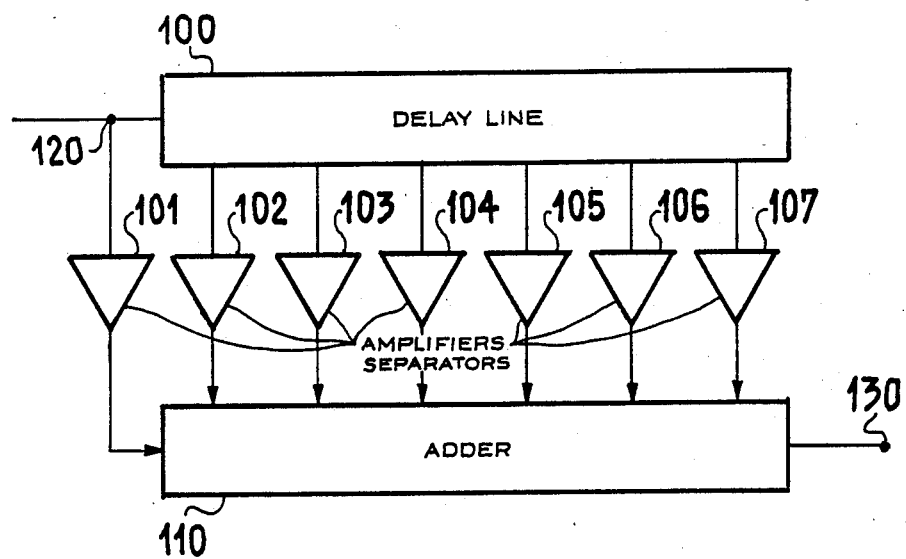
FIG_4
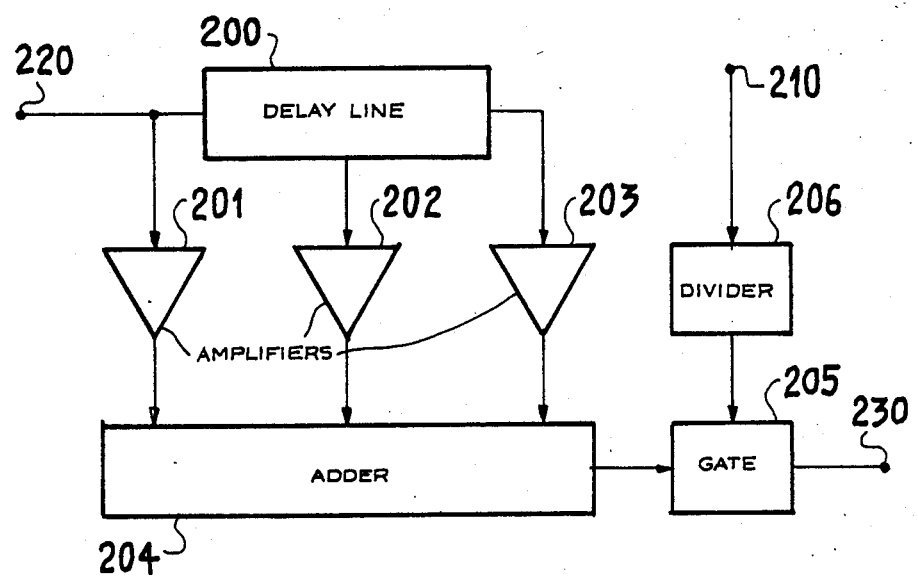
FIG_5

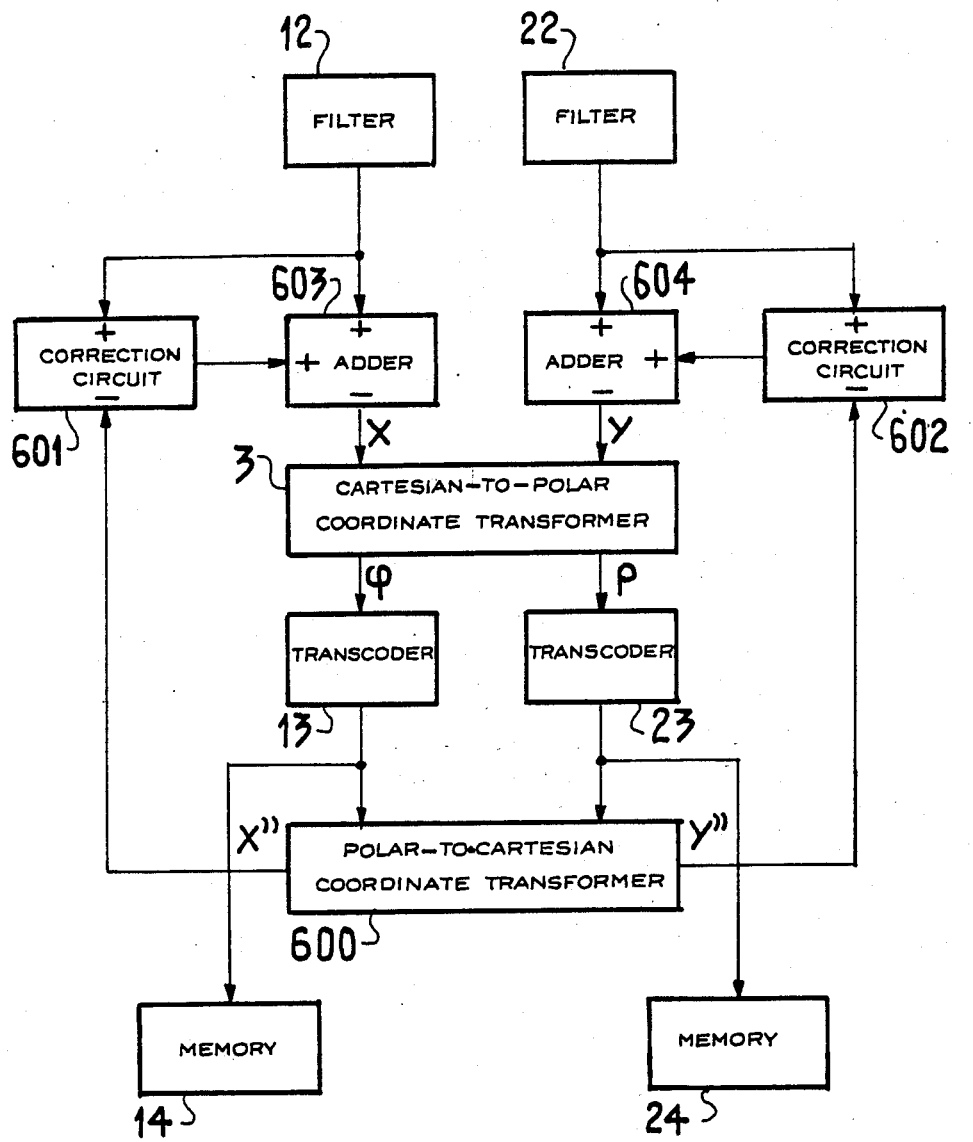
FIG_8

DEVICE FOR PROCESSING SIGNALS FROM A SIDE-LOOKING RADAR

FIELD OF THE INVENTION

Our present invention relates to devices for processing signals from a side-looking radar and, more especially, devices for processing by correlation which enable the ground echoes received by the radar to be shown up for the particular purpose of producing a detailed group map.

BACKGROUND OF THE INVENTION

A side-looking radar has one or two antennas which are pointed in a direction perpendicular to the aircraft axis and it emits pulses which sweep the ground. The return echoes contain data concerning the ground; the better the system resolution, the better the ground image which can be produced. In the direction perpendicular to the aircraft axis, a fine transverse resolution is obtained by the emission of short pulses using, for example, the technique called "pulse compression". In the direction of the aircraft movement, an equivalent resolution can be obtained only by suitable processing of the video signal delivered by the radar receiver.

Among the processing devices known in the art, those which use a correlation procedure are the only ones at present allowing a sufficiently fine resolution to be obtained. However, processing must be done on the gorund because of the complexity and volume of the equipment which cannot be airborne.

Existing devices use either an optical correlation procedure, which requires the video signal to be recorded on a photosensitive base, to be developed and processed in coherent light by equipment which is not only highly sophisticated but also costly, fragile and cumbersome, or a digital correlation process using an actual computer which receives the data recorded in flight and coded. In neither case can processing be carried out in real time, nor can the image of the terrain explored be presented to the pilot or used immediately on board the aircraft in flight.

OBJECTS OF THE INVENTION

An object of our present invention is to provide a device for processing by digital correlation which obviates the above disadvantages and is sufficiently compact for installation aboard an aircraft while providing a resolution which is fine and comparable to that of a device processing by optical correlation.

Another object of our invention is to provide a digital processing device which operates by correlation between the phase of the signals received and that of a synthesized replica.

A further object of the present invention is to provide a digital processing device, operating in real time, which can be installed on an aircraft, space laboratory or satellite.

SUMMARY OF THE INVENTION

In accordance with the invention, we provide a device for processing signals from a side-looking radar comprising input circuitry for sampling and coding in digital form, on the one hand, the phase $\phi$ and, on the other hand, the amplitude or modulus $\rho$ of the video signals delivered by the radar receiver, storage means for registering samples received and coded during a given number M of successive recurrences, signal-generating means for producing M digital samples of the phase $\theta_i$ of a constant-modulus synthetic signal, called a "replica", correlation means for computing, for each recurrence and each section of a sweep range, the sums $$X' = \sum_{i=1}^{M} \rho_i \cos(\phi_i - \theta_i) \text{ and } Y' = \sum_{i=1}^{M} \rho_i \sin(\phi_i - \theta_i)$$

from 2M phase samples $\phi_i$ and modulus samples $\rho_i$ registered during the M preceding recurrences and M successive and respective phase samples $\theta_i$ of the replica, and arithmetic means for computing the modulus $\rho'$ of a signal whose cartesian components are X' and Y'.

BRIEF DESCRIPTION OF THE DRAWING

Other features and advantages of our invention will become apparent from the following description given with reference to the accompanying drawing in which:

FIGS. 1 and 2 are explanatory diagrams;

FIG. 3 is a general block diagram of a processing device according to our invention;

FIGS. 4 and 5 show embodiments of filtering or preprocessing circuits;

FIG. 7 is a table relating to the operation of the computing circuit of FIG. 6; AND FIG. 8 shows a partial modification of the circuitry of FIG. 3.

SPECIFIC DESCRIPTION

Figure 6:
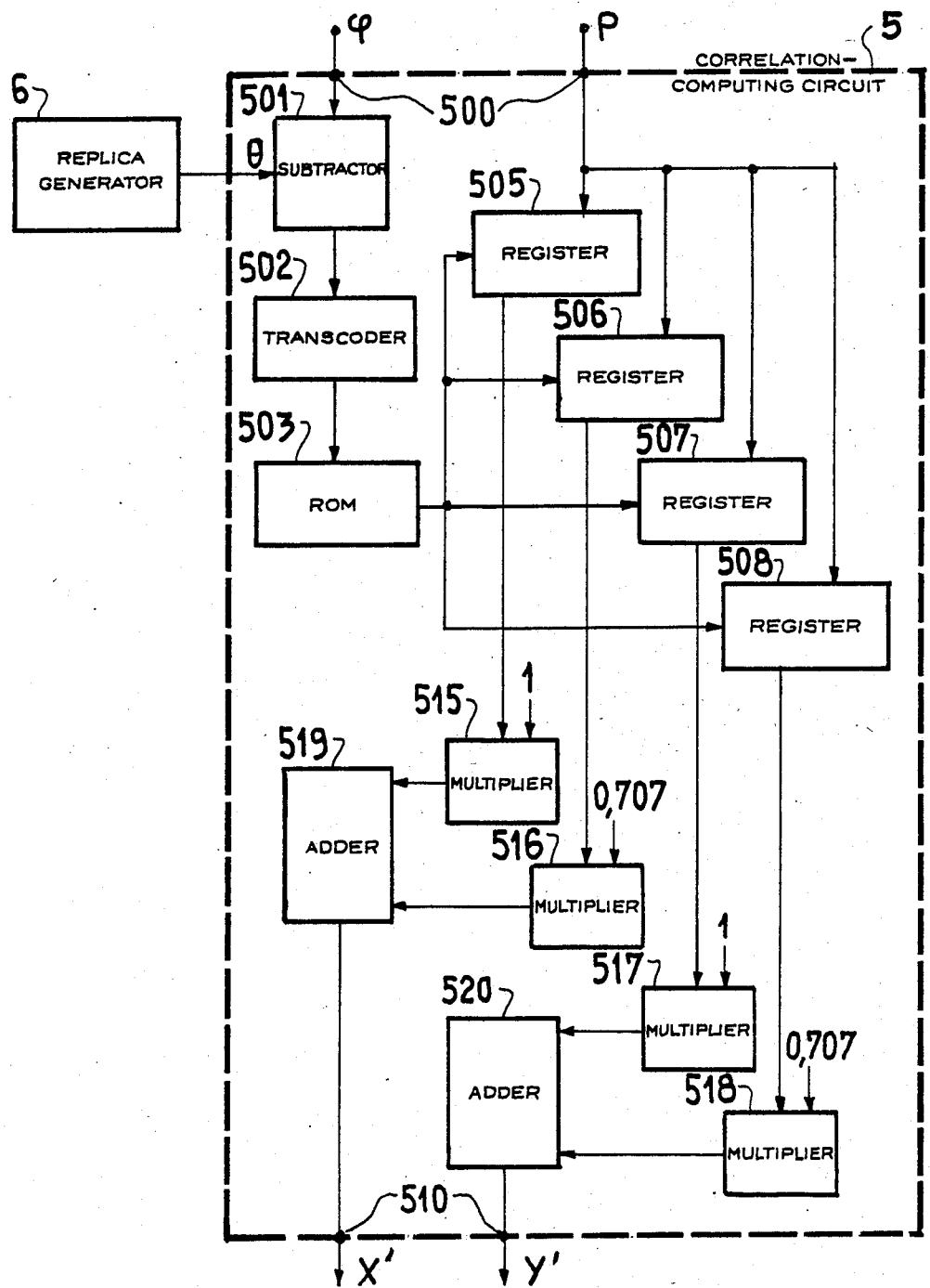
FIG. 6 shows details of a correlation-computing circuit.

Consider an aircraft A (FIG. 1) carrying a side-looking radar system. The antenna pointed in the direction perpendicular to the direction of the aircraft movement emits pulses which sweep the terrain at the side of the aircraft. The echoes which return in succession, during each recurrence, represent the image of the flight position in the antenna diagram. As the aircraft moves, the signals received enable the reproduction of a very detailed image of the region observed.

In order to provide images of good quality, the transverse resolution (in the direction perpendicular to the aircraft movement) and the longitudinal resolution (in the direction of the aircraft movement) must be fine and preferably identical.

The transverse resolution depends on the length of the pulses emitted. The emission of short pulses is achieved by means of the pulse-compression technique, and the breaking up of the incoming signal into short-range sections enables adequate transverse resolution to be obtained.

The longitudinal or "en route" resolution depends more on the antenna-beam width and on the processing device which does synthetic refining of the beam.

As an example, a beam with an opening of 35 mrad. enables a longitudinal resolution of 70 m to be obtained at a range of 2 km without a refining process whereas the emission of 30-nanosecond pulses enables a transverse resolution of 5 m to be obtained at all ranges. The processing device used with the radar enables a longitudinal resolution of the same order to be obtained.

In FIG. 1, the aircraft A and the antenna beam $F_a$ are shown. An object on the ground passes through the antenna beam during the aircraft's passage and describes a rectilinear trajectory represented by the axis x'—x with respect to the aircraft A. The detected object enters the beam at point C and leaves it at point B. The point O represents the projection of point A (the aircraft) on the axis x'—x. The distance D=AO is a minimum. Any other distance D'=AP between the aircraft and an object on the axis x'—x is greater than D. Between the instant when the object on the ground enters the beam (point C) and the instant when it leaves (point B), the distance D' varies according to a square law:

$$D' \approx D + \frac{x^2}{2D},$$

the origin of x being chosen as point O.

Between the instants of emission and reception of the radar pulses, the phase of a signal of wavelength $\lambda$ has varied by:

$$\phi = 4\pi D/\lambda$$

The phase $\phi$ relative to an object moving along the axis x'—x varies therefore according to a square law of the type:

$$\phi = \phi_o + Bx^2$$

This law is shown in FIG. 2. The Doppler frequency of the ground echo, which is the derivative of the phase with respect to time, obeys a linear law $f_d$ represented by a line passing through O when the echo x is at point O.

The received signal S(t) is demodulated coherently; it retains its phase $\phi(t)$ and its modulus $\rho(t)$ given by the equation $$S(t) = \rho(t) \, e^{j\phi(t)}$$

The amplitude $\rho(t)$ is a function of the antenna gain.

The processing system in accordance with the invention performs the correlation of this signal with a reference signal (the replica SR) whose phase obeys a square law $\theta(t)$ similar to $\rho(t)$ and whose amplitude is constant:

$$SR(\tau) = \int_{-t_o}^{+t_o} \rho(t - \tau) e^{j\phi(t-\tau)} \, e^{-j\theta(t)} dt$$

where $2t_o$ is the time taken by a point echo to cross the beam.

A very small peak width is obtained on correlation with respect to that of the antenna beam. As in the case of optical correlation, a maximum theoretical resolution is obtained equal to half a wavelength.

Special processing means are used to obtain this correlation in real time. The airborne radar is a pulse radar and each recurrence is split up into range sections with a repetition period for the range sections roughly equal to the pulse length so as not to lose data on the radar range. It is therefore advantageous to use the video signals in the form of samples coded in digital form.

In each range section and then during successive recurrences, for each echo, a certain number of successive samples characterized by their amplitude or modulus $\rho$ and phase $\phi$ are placed.

The replica with which the correlation is carried out is also formed of successive samples whose modulus is constant (equal to unity so that it does not enter into the calculations) and whose phase $\theta$ obeys a square law.

The correlation operation is then written:

$$S_{(n)} = \sum_{i=-N}^{+N} \rho(i - n) \cdot \exp[j\phi(i - n)] \cdot \exp[-j\theta(i)]$$

where $2N+1=M$ is the number of samples of the replica which will be correlated with the same number of samples of the received signal. To obtain a sample of the signal $S_{(n)}$, this correlation requires M recurrences of the received signal to be stored in the memory and circuits able to compute $S_{(n)}$ for each range section for each radar recurrence to be used.

The use of an appropriate quantification of the difference $\phi - \rho$ makes it possible to do without all the rapid multiplications theoretically required for the correlation calculation and makes processing in real time possible.

However, the refined echo obtained by correlation only has large secondary lobes because the correlation function obtained is of the form $$\frac{\sin x}{x}.$$

To reduce the size of these lobes and also to allow a reduction in the sampling frequency without too much loss in the signal-to-noise ratio, the received signal, before correlation, undergoes a pretreatment which is a digital low-pass filtering obtained by non-recursive summation of samples.

Also, digital processing requires several quantifications to reduce the volume of the computing circuits and memories, i.e. quantification of in-phase and quadrature components X, Y of the input signal in terms of the modulus $\rho$, the phase $\phi$ and the difference $\phi - \theta$.

FIG. 3 shows a general block diagram of the processing device according to our invention.

The signals delivered by the radar receiver are applied at an intermediate frequency to the device's input E. The samples computed for the correlation function for each range section for each recurrence are emitted at an output S in digital form and can be recorded by any suitable means or presented on the screen of a cathode-ray tube whose sweep is synchronized with the sweep of the radar-range sections and with the aircraft's speed. Ground images can then be recorded on a photosensitive base by a photographic apparatus placed in front of the tube screen.

The incoming signals applied to input E are passed to two identical amplitude-phase detectors 10 and 20. Detector 20 receives a sinusoidal reference signal coming straight from a local oscillator 1 which is coherent in phase with the radar transmitter. Detector 10 receives this same reference signal through a 90° dephasing circuit 2. The frequency of local oscillator 1 is equal to the intermediate frequency of the signals applied to input E. The X and Y signals delivered by detectors 10 and 20 are therefore at video frequency.

The X and Y signals are then applied to sampler-coders 11 and 21 respectively so that they may be passed to the rest of the device in digital form. Fine resolution of the radar range obtained by the emission of narrow pulses requires coding at a high rate. Allowing for the time required for coder operation, it may be necessary to use several coders per channel and an arrangement for distributing the signals between them by time multiplexing. For reasons of clarity. FIG. 3 shows only one coder per channel.

These coders are followed respectively by pretreatment circuits 12 and 22 which are identical for both channels. This pretreatment consists in low-pass transverse digital filtering. Such preprocessing retains the signals' phase characteristics but changes the amplitude spectrum to attenuate the size of the secondary lobes of the correlated echo. It also makes sub-sampling possible, i.e. a reduction in sampling rate without too much loss in the signal-to-noise ratio compared with the case where all the recurrences are used and without introducing ambiguities. These circuits contain buffer memories, shift registers whose length is equal to the number of range sections to be processed, and arithmetic units (addition, subtraction). A fuller description of these circuits will be given with reference to FIGS. 4 and 5.

The X and Y signals delivered by the pretreatment circuits are then applied to the inputs of a transformation circuit 3 which converts cartesian coordinates into polar coordinates and delivers the amplitude $\rho$ and the instantaneous phase $\phi$ of the coded and pretreated incoming signal.

The digital components $\phi$ and $\rho$ are applied respectively to transcoding circuits 13 and 23 whose purpose is to reduce the number of bits to be registered for each phase and amplitude sample.

Amplitude-transcoding circuit 23, for example, performs a logarithmic approximatioin to base 2 which is implemented by the following operation: The circuit derives a value $\rho = K + \alpha$ from the input modulus $\rho$ which can be written $$\rho = 2^K (1 + \alpha) \text{ with } \alpha \epsilon [0, 1],$$

$\alpha$ being thus a fraction between 0 and 1. The precision to be given to the term $\alpha$ depends on the specific transcoding mode employed.

Phase-transcoding circuit 13 performs a quantization with m phase positions which is implemented by the following operation: The circuit conforms the number p, which lies between 0 and m−1, to the input phase $\phi$ so that this phase lies in the interval:

$$\left(p - \frac{1}{2}\right)\frac{2\pi}{m} \leq \phi < \left(p + \frac{1}{2}\right)\frac{2\pi}{m}$$

This is the same as dividing the period (0, $2\pi$) into m equal intervals numbered from 0 to m−1 and assigning to each value of $\phi$ the number of the interval in which it is located.

The several transcoding circuits, depending on the quality of the performance required, enable phase and amplitude words, whose length is only 3 or 4 bits, to be passed to memories 14 and 24 which are controlled by a circuit 4.

A system for correcting errors due to transcoding can be provided. This system is omitted in FIG. 3 for the sake of simplicity but has been illustrated in FIG. 8 and will be described later.

Memories 14 and 24 respectively store the phase words and the amplitude words of all the range sections of a number of recurrences corresponding to the width of the replica used. As an example, the display of a strip of terrain 5 km wide with a resolving power of about 5×5 m, taking into account the pretreatment and transcoding of the amplitude and phase, requires a memory of about 2.5 megabits.

These memories are so arranged that the fresh data corresponding to all the range sections of a fresh recurrence are stored in a row after shifting by one row all the data received during the preceding recurrences. Reading is done in columns, i.e. all the data concerning the same range section are nondestructively read in succession and applied to a correlation-computing circuit 5.

Before being applied to computing circuit 5, the data read out from the memories undergo decoding in decoders 15 and 25, respectively, which perform the reverse operations of transcoders 13 and 23, respectively. It follows that each data item after decoding contains a larger number of bits than that from which it came in the corresponding memory. In particular, decoding circuit 15 computes the phase $$\phi = p \frac{2\pi}{m}$$

where p is the value read out from phase memory 14. Amplitude-decoding circuit 25 computes $\rho = 2^K (1 + \alpha)$ from the value $K + \alpha$ read out from modulus memory 24 in which K is the integral part and $\alpha$ is the fractional part of the number (after the decimal point) since it lies between 0 and 1.

In synchronism with the reading of memories 14 and 24, a circuit 6 generates the samples of phase $\theta$ of the replica. The value of these samples obeys a square law as stated above. They appear as a series of numbers of value $k \cdot i^2$, modulus $2\pi$, where k is a constant depending on the radar range and hence on the number of the range section processed and i is the number of the sample in the series generated. The value of k may change with each range section; in this case, there are as many values of k as there are range sections. Alternately, the values of k are fewer in number than those of the range sections and each value of k is assigned to a group of sections which simplifies the design of replica generator 6.

This replica generator 6 is formed by a computing circuit which peforms the multiplications $k \cdot i^2$ for each range section from a recorded phase step k. It may also be formed by a programmed read-only memory (PROM) which is read in synchronism with memories 14 and 24.

The first solution has the advantage of a smaller circuitry volume.

Computing circuit 5 therefore receives in succession the series of samples of modulus $\rho$ and of the phase angle $\phi$ read in the memories and decoded, which correspond to the various radar-range sections, on the one hand, and to the replicas of phase $\phi$ with which these series are respectively correlated, on the other hand. Computing circuit 5 then emits after each calculation as many samples of correlation functions as there are range sections.

As the processing of the various range sections occurs sequentially, we shall limit the rest of the description to the operation of the computing circuit for only one of them; all the other sections are processed identically but with a shift in time.

Each sample of the correlation function which is computed in a range section is delivered in the form of its two cartesian components X' and Y'. These components are applied to respective low-pass filter circuits 16 and 26 which are similar to pretreatment circuits 12 and 22. These low-pass filters are used to reduce the noise which arises from the various quantifications introduced in the computing channel and is still there at this level of processing. Then the filtered components are used for the calculation of the correlation-function-sample modulus in a computing circuit 7. This circuit peforms the operation:

$$\rho' = \sqrt{X^2 + Y^2}$$

either by means of digital arithmetic circuits or by means of a two-input programmed ROM.

Modulus $\rho'$, delivered in digital form, is passed to output S where it can be used directly either to display an image of the terrain after digital-analog conversion or for recording.

Before explaining the detailed operation of correlation-computing circuit 5, which is the core of the present processing device, we shall refer to FIGS. 4 and 5 representing examples of pretreatment or filtering circuits such as those shown in FIG. 3 at 12, 22, 16 and 26.

FIG. 4 shows a conventional digital low-pass filter circuit. It is a transverse or nonrecursive filter. This filter delivers a linear combination of several successive samples of the signal.

It includes a delay line 100, which has one input and six outputs, the number of outputs being given merely as an example, seven amplifier-separators 101 to 107 which are connected to the input and outputs of line 100, and an adder 110 which sums the amplifier output signals. The incoming signals are applied to a terminal 120 which is connected to the input of line 100 whereas the output signals, delivered by adder 110, are available at an output terminal 130. The delay between the input of line 100 and the first output or between two consecutive outputs is equal to the radar-pulse-repetition period so that all the successive samples present in the line at a given instant belong to the same range section.

This filter, which is analog in appearance, may of course be constructed purely of digital circuits as is the case in the processing device according to our invention.

In this case, delay line 100 is formed by a shift register or a "CCD" charge-coupled circuit, amplifiers 101 to 107 are digital multiplier circuits and adder 110 is of digital design.

The use of a recursive filter would seem to have been more advantageous because it uses a smaller number of circuits and a smaller number of samples. However, the phase law is not transmitted linearly by such a filter and the phase is the essential information on which the correlation operation is carried out. It is necessary therefore that the transmission of phase information between the receiver output and the computing circuit be as linear as possible. This requirement calls for the use of a nonrecursive filter.

FIG. 5 shows a modification of the preceding filter which, in addition, reduces the number of samples passed to the correlator. There, a delay line 200 has only two outputs (by way of example) and is associated with three amplifiers 201, 202 and 203 coupled to a digital adder 204. The adder output is connected to a terminal 230 through a gate 205. This gate is designed to open only once for every three recurrences to divide by 3 the number of samples to be registered. The gate 205 is controlled by a 1÷3 divider 206 which receives, on a terminal 210, the usual synchronizing signals.

FIG. 6 shows the computing unit 5 of the correlator.

The samples of phase $\phi$ and modulus $\rho$ read in memories 14 and 24 and decoded are applied to inputs 500 of computing circuit 5. Phase $\phi$ is applied to a subtractor 501 which receives the replica $\theta$ from generator 6. The difference between phase angles $\phi$ and $\theta$ is converted by a transcoder 502 into a given number of phase positions (eight for example). The transcoding result is used as the address for a ROM 503 whose programming is shown in FIG. 7.

During this time, the amplitude of sample $\rho$ is applied to algebraic registers 505, 506, 507 and 508. These registers can either add (+) or subtract (−) the new value of $\rho$ to or from the previous content or ignore it (0).

There are four times fewer registers than transcoded phase values $\phi - \theta$ to compute each of the X' and Y' components of the correlated signal. When all the samples stored for a range section have thus been processed, the content of each register is multiplied by the cosine or the sine of the corresponding phase and the various results are summed to give the components of a correlated signal sample.

Thus the content of register 505 is applied to a multiplier circuit 515 in which it is multiplied by the coefficient 1=cos 0°= −cos 180° and the content of register 506 is similarly applied to a multiplier circuit 516 using the coefficient 0.707=cos 45°= −cos 135°= −cos 225°=cos 315°.

The addition of the results obtained at the outputs of the multipliers in an adder 519 enables the component X' to be derived, according to the formula $$X' = \Sigma \rho \cos(\phi - \theta),$$

from the correlated signal for the eight transcoded values listed in the left-hand column of the table in FIG. 7.

In the same way, the content of register 507 is multiplied in an algebraic circuit 517 using 1=sin 90°= −sin 270° and the content of register 508 is multiplied in an algebraic circuit 518 using 0.707=sin 45°= −sin 225°= −sin 315°. The sum of the signals of multipliers 517 and 518 used for these operations is calculated in an adder 520 which derives the component $$Y' = \Sigma \rho \sin(\phi - \theta)$$

from the correlated signal for the eight transcoded values.

Components X' and Y' are obtained for the products of modulus $\rho$ for a limited number of values of $\sin(\phi - \theta)$ and $\cos(\phi - \theta)$ since the difference $\phi - \theta$ is transcoded in a limited number of phase positions.

With the choice of eight phase positions 45° apart, the values of $\sin(\phi - \theta)$ and $\cos(\phi - \theta)$ are equal to either 0 or ±1 or ±0.707.

ROM 503 regroups moduli $\rho$ which are to be multiplied by $\cos(\phi - \theta) = \pm 1$ or 0 in adder-subtractor 505 and those which are to be multiplied by $\cos(\phi - \theta) = \pm 0.707$ in adder-subtractor 506. The product with the sine is obtained in the same way after summation of the values of $\rho$ in adder-subtractors 507 and 508. Thus the number of multiplications is reduced to two for the calculation of each sample of the correlation function. This way of working makes it possible to avoid the many rapid multiplications which a correlation calculation without quantifying would require.

Thus the calculations can be made in real time.

FIG. 8 shows a quantification-error-correction component for reducing noise and errors due to coding and transcoding before recording.

Adder circuits 603 and 604 are respectively inserted between filters 12 and 22, on the one hand, and coordinate converter 3, on the other hand. These circuits add to the X and Y signals corrective values to compensate for the errors introduced by quantifying and transcoding. To do this, a circuit 600 for converting polar coordinates into cartesian ones restores the values of X and Y after processing in transcoding circuits 13 and 23. These signals are compared with the same X and Y signals, present at the output of filters 12 and 22, by means of correction circuits 601 and 602 which inject into adders 603 and 604 the corrective values indicated.

The processing system according to our invention yields results similar to those obtainable from a system using a processing method without quantification.

On the other hand, the aforedescribed assembly of circuits can operate in real time and allow, for example, the display of a strip of terrain 5 km wide with a resolving power of 5×5 m in a circuitry volume of about 50 liters. This volume is compatible with airborne use of the equipment.

Our improved processing system can be used directly aboard an aircraft equipped with a side-looking radar. It can also be used on the ground to process the video signals of a radar recorded in flight and transmitted directly by a radio channel. In this case, some pretreatment can be carried out on board to reduce the quantity of data to be recorded or transmitted.

What is claimed is:

1. A device for processing video signals from a side-looking radar receiver, comprising input means for sampling and coding in digital form the phase $\phi$ and the amplitude $\rho$ of the incoming video signals, storage means for registering samples received and coded during a given number M of successive recurrences, generating means for producing M digital phase samples $\theta_i$ of a constant-modulus syntehtic replica signal, correlation means for computing, for each recurrence and each section of a sweep range, the sums $$X' = \sum_{i=1}^{M} \rho_i \cos(\phi_i - \theta_i) \text{ and } Y' = \sum_{i=1}^{M} \rho_i \sin(\phi_i - \theta_i).$$

from 2M phase samples $\phi_i$ and modulus samples $\rho_i$ registered during the M preceding recurrences and M successive and respective samples $\theta_i$ of the replica signal, and arithmetic means for computing the modulus of the signal whose cartesian components are X' and Y'.

2. A device as defined in claim 1, further comprising transcoding means ahead of said storage means for reducing the number of bits to be registered for each sample of phase and amplitude, and decoding means inserted between said storage means and said correlation means for restoring the samples to their original values.

3. A device as defined in claim 2 wherein said transcoding means comprises an amplitude transcoder for deriving from the amplitude samples, and delivery to said storage means, an integer K and a fractional value $\alpha$, said decoding means comprising an amplitude decoder connected to said storage means for reconstructing the amplitude $\rho = 2^K(1 + \alpha)$ from the numbers K and $\alpha$ generated by said amplitude transcoder.

4. A device as defined in claim 2 wherein said transcoding means comprises a phase transcoder for deriving from the phase samples, and delivering to said storage means, a whole number p between 0 and (m−1) identifying an interval related to the phase $\phi$ by the expression $$\left(p - \frac{1}{2}\right)\frac{2\pi}{m} \leq \phi < \left(p + \frac{1}{2}\right)\frac{2\pi}{m},$$

said decoding means comprising a phase decoder connected to said storage means for reconstructing the phase $$\phi = p\frac{2\pi}{m}$$

from the value p generated by said phase transcoder.

5. A device as defined in claim 2, further comprising transformation means connected to said transcoding means in parallel with said storage means for converting the polar coordinates of samples registered therein into cartesian coordinates, comparison means connected to said transformation means and to said input means for deriving corrective signals from said cartesian coordinates and from the received video samples, and adder means upstream of said transcoding means for superimposing said corrective signals upon the samples fed to said storaqge means.

6. A device as defined in claim 1 wherein said generating means comprises a circuit for computing a value $k \cdot i^2$ for each range section and each recurrence, k being a number individual to at least one range section and i being an integer lying between limits $-N$ and $+N$ where $2N+1$ is the number of said replica signal to be correlated with as many samples of the incoming video signal.

7. A device as defined in claim 1 wherein said generating means comprises a programmed ROM connected to be read in synchronism with said storage means.

8. A device as defined in claim 7, further comprising low-pass filter means including a transverse digital filter upstream of said storage means for reducing the rate of data to be processed.

9. A device as defined in claim 1, further comprising digital low-pass filter means inserted between said correlation means and said arithmetic means.

10. A device as defined in claim 1 wherein said correlation means comprises a subtractor circuit connected to receive video phase samples $\phi_i$ from said storage means and replica phase samples $\theta_i$ from said generating means for calculating their differences $\phi_i - \theta_i$, and algebraic means for generating the components X' and Y' as the sums of the M successive video amplitude samples $\rho_i$ respectively multiplied by the cosine and the sine of the corresponding differences $\phi_i - \theta_i$.

11. A device as defined in claim 10 wherein said algebraic means comprises two groups of adder-subtractor registers, a phase transcoder for converting each difference $\phi_i - \theta_i$ into one of m equispaced numbers between 0 and $2\pi$, control means for selectively incrementing the contents of said registers in response to said m numbers, two groups of multiplier circuits respectively connected to said groups of registers for multiplying their contents by finite, sine and cosine values corresponding to said m numbers, a first adder connected to the outputs of one of said groups of multiplier circuits for emitting the value $X' = \Sigma \rho_i \cos(\phi_i - \theta_i)$, and a second adder connected to the outputs of the other of said groups of multiplier circuits for emitting the value $Y' = \Sigma \rho_i \sin(\phi_i - \theta_i)$.

* * * * *